United States Patent
Sattler et al.

[19]

[11] Patent Number: 5,950,587
[45] Date of Patent: Sep. 14, 1999

[54] CONTINUOUSLY VARIABLE RUNNER LENGTH MANIFOLD

[75] Inventors: Eric R. Sattler, Trenton; Joel S. Myers, Southgate; Michael J. Haspel, Westland, all of Mich.

[73] Assignee: BASF Corporation, Mount Olive, N.J.

[21] Appl. No.: 09/120,563

[22] Filed: Jul. 22, 1998

[51] Int. Cl.[6] .................................................. F02B 27/06
[52] U.S. Cl. ............................. 123/184.55; 123/184.53
[58] Field of Search ........................... 123/184.55, 184.53

[56] References Cited

U.S. PATENT DOCUMENTS

| 4,619,226 | 10/1986 | Ueda et al. | ........................ 123/52 MB |
| 4,699,630 | 10/1987 | Lee et al. | ............................... 48/180.1 |

FOREIGN PATENT DOCUMENTS

| 237755 A2 | 9/1987 | European Pat. Off. . | |
| 2682431-A1 | 4/1993 | France . | |
| 3825000 A1 | 2/1989 | Germany | ........................ 123/184.55 |
| 60-224923 | 11/1985 | Japan | ................................. 123/184.55 |
| 2239899 | 7/1991 | United Kingdom | .............. 123/184.55 |

*Primary Examiner*—Erick R. Solis
*Assistant Examiner*—Brian Hairston
*Attorney, Agent, or Firm*—Ryan W. Massey; James J. Drake

[57] ABSTRACT

A continuously variable runner length manifold is provided for an internal combustion engine. The continuously variable runner length manifold includes a housing having an inlet port and a plurality of outlet ports defined by a plurality of stacked manifold sections. A plurality of runner members are rotatably mounted within the housing. The runner members include wall portions which combine with the housing to define a plurality of runners in communication with a plenum and a respective one of the outlet ports. The runners have a length which is continuously variable upon rotation of the runner members relative to the housing.

12 Claims, 8 Drawing Sheets

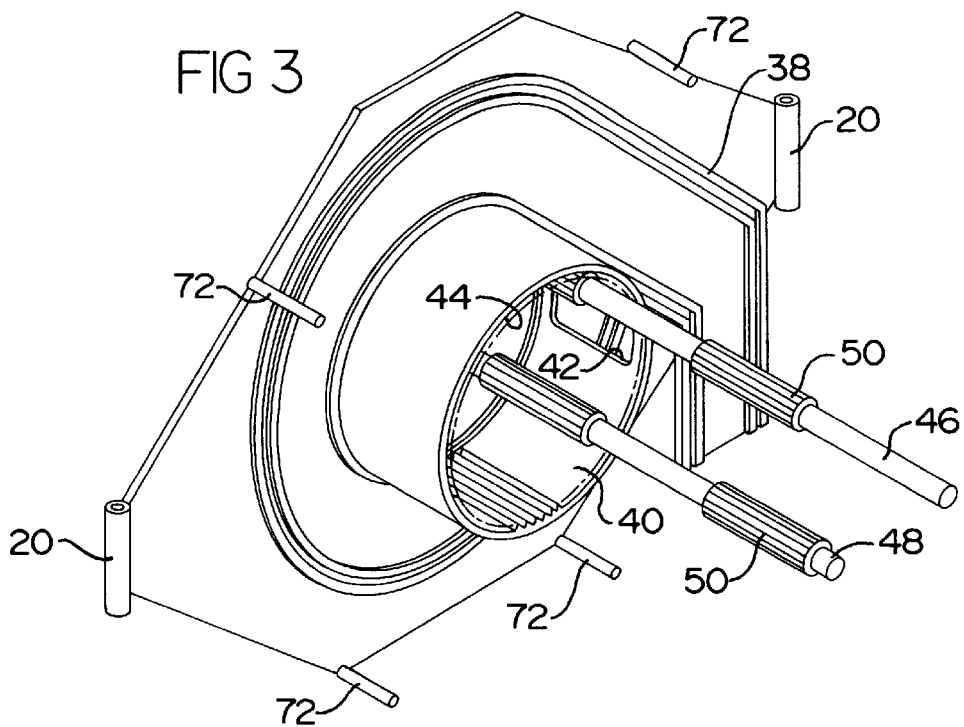
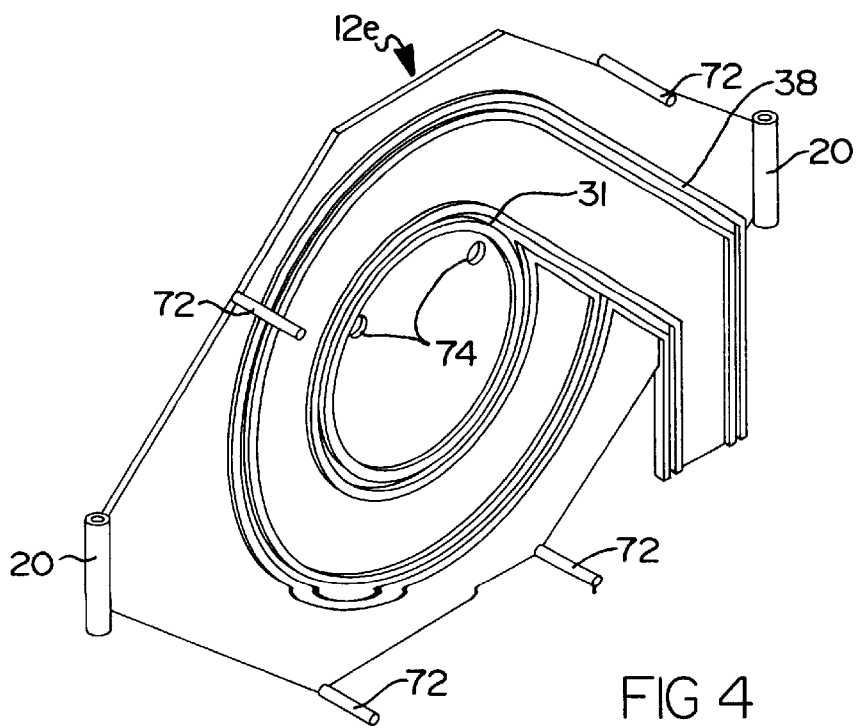

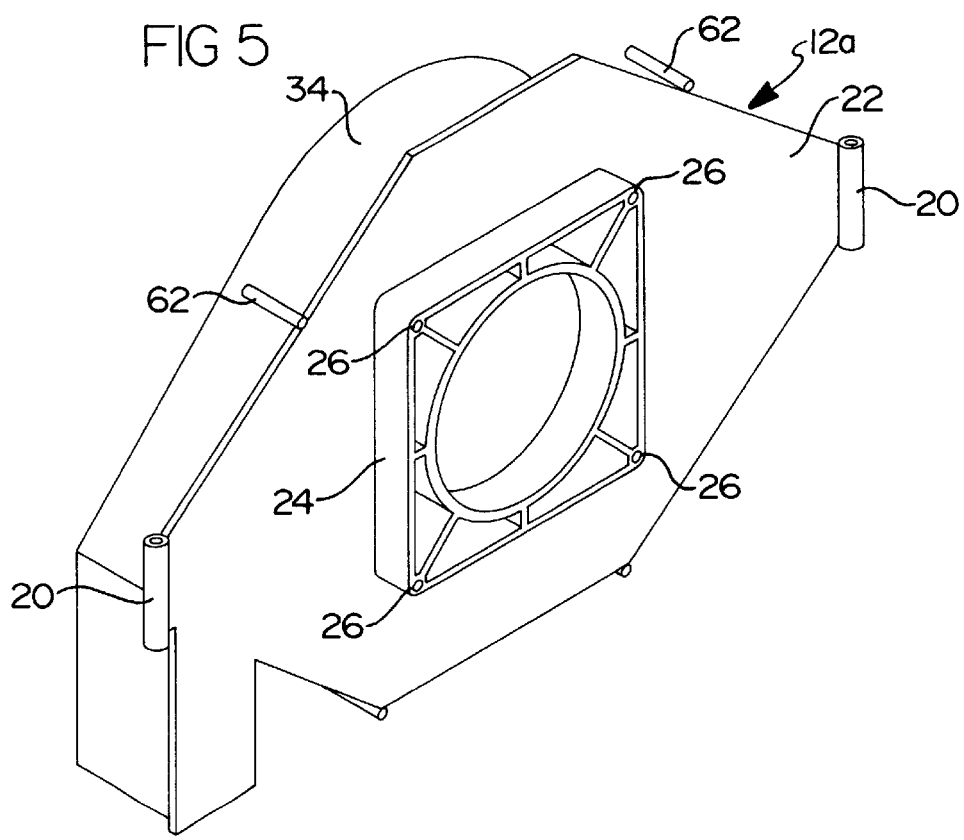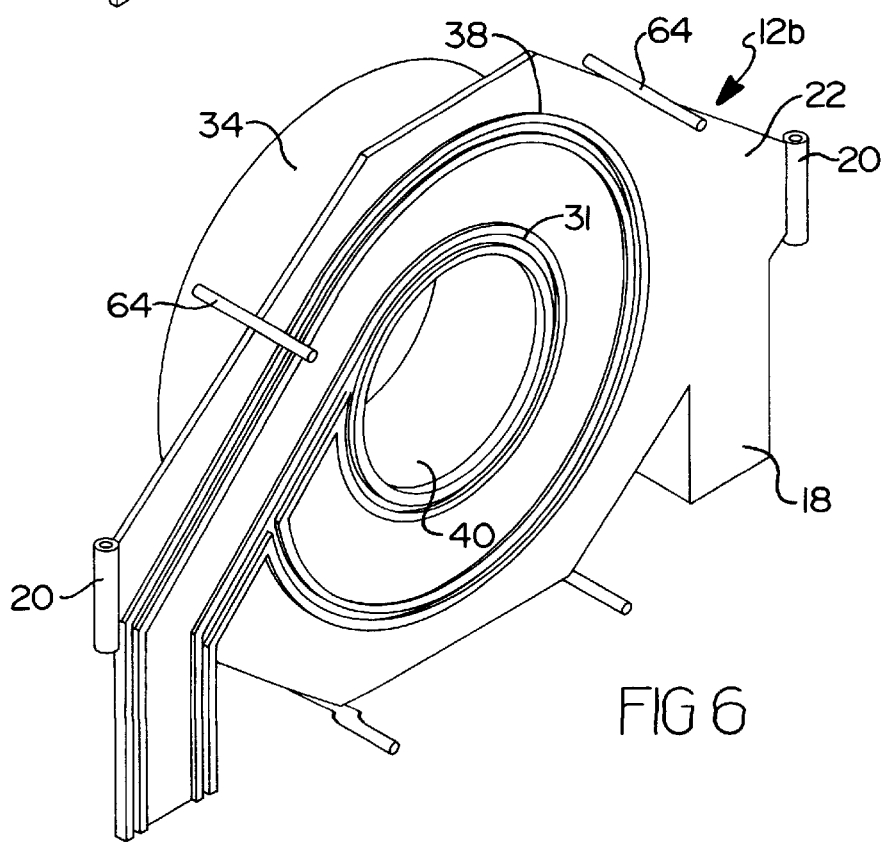

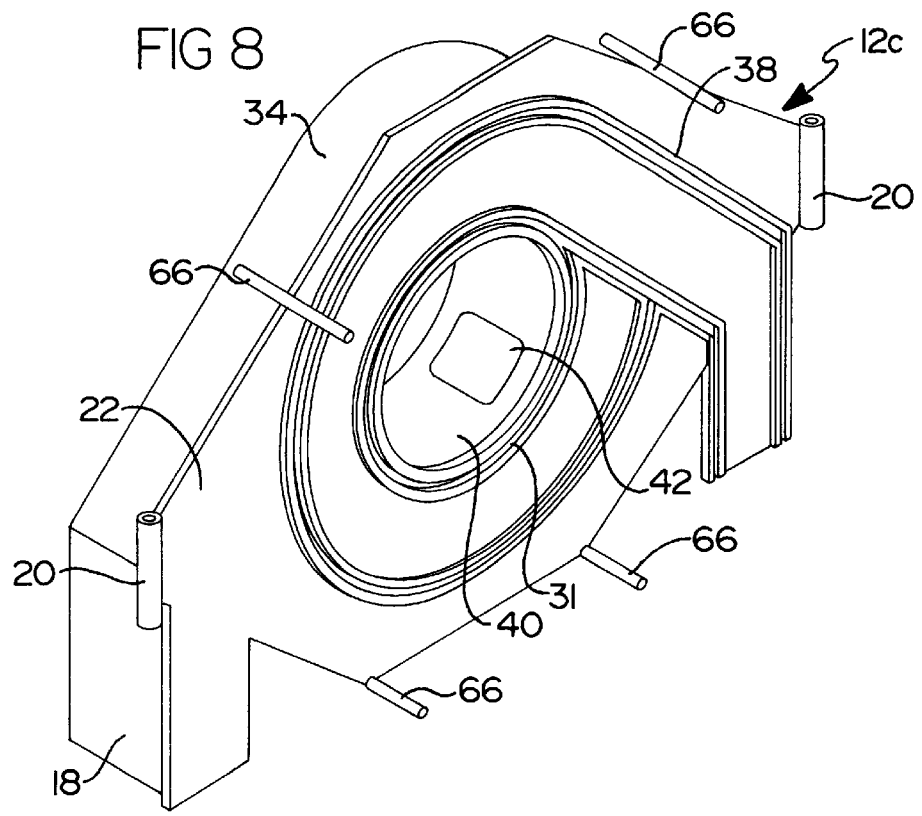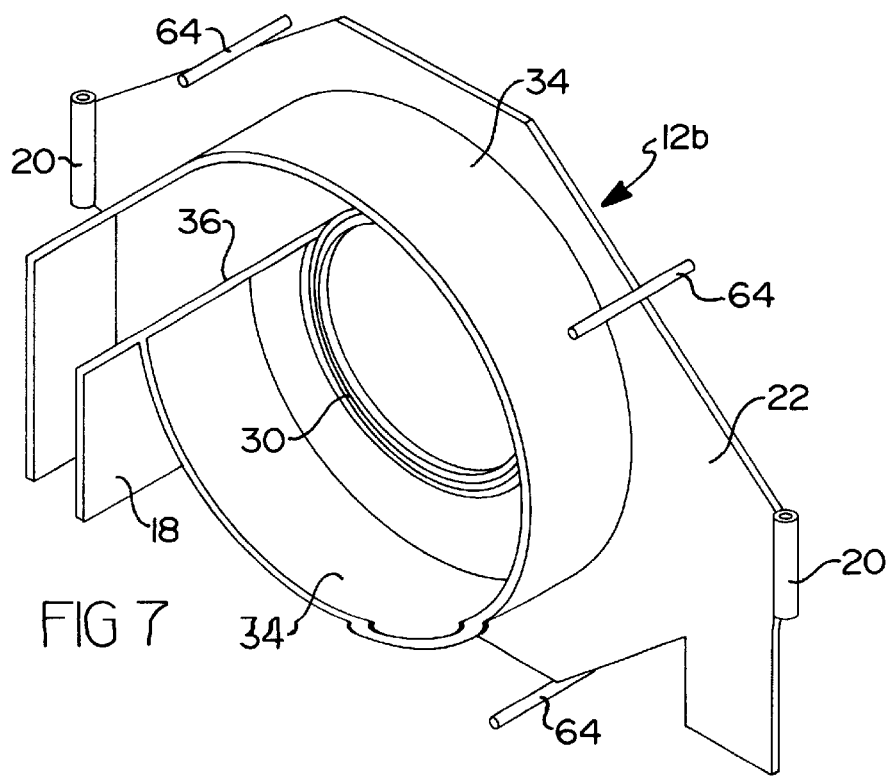

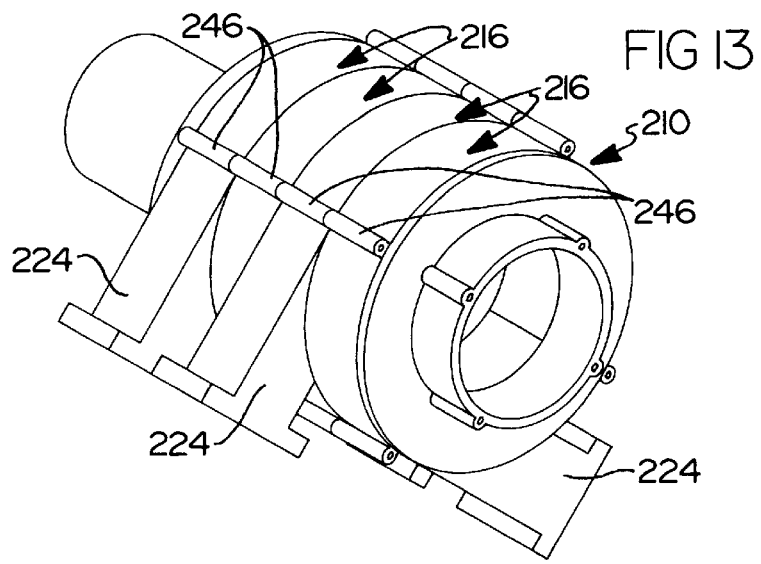
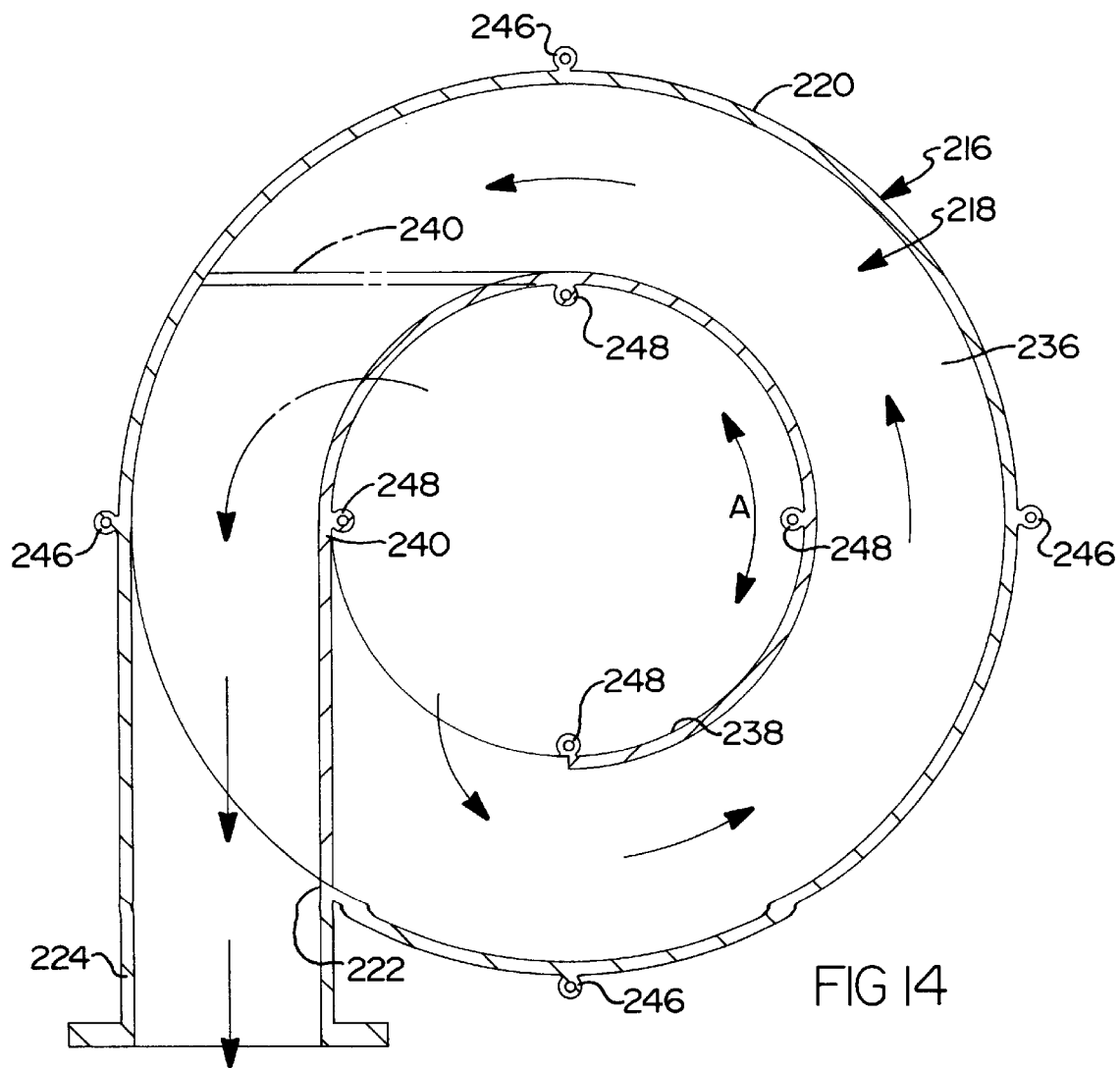

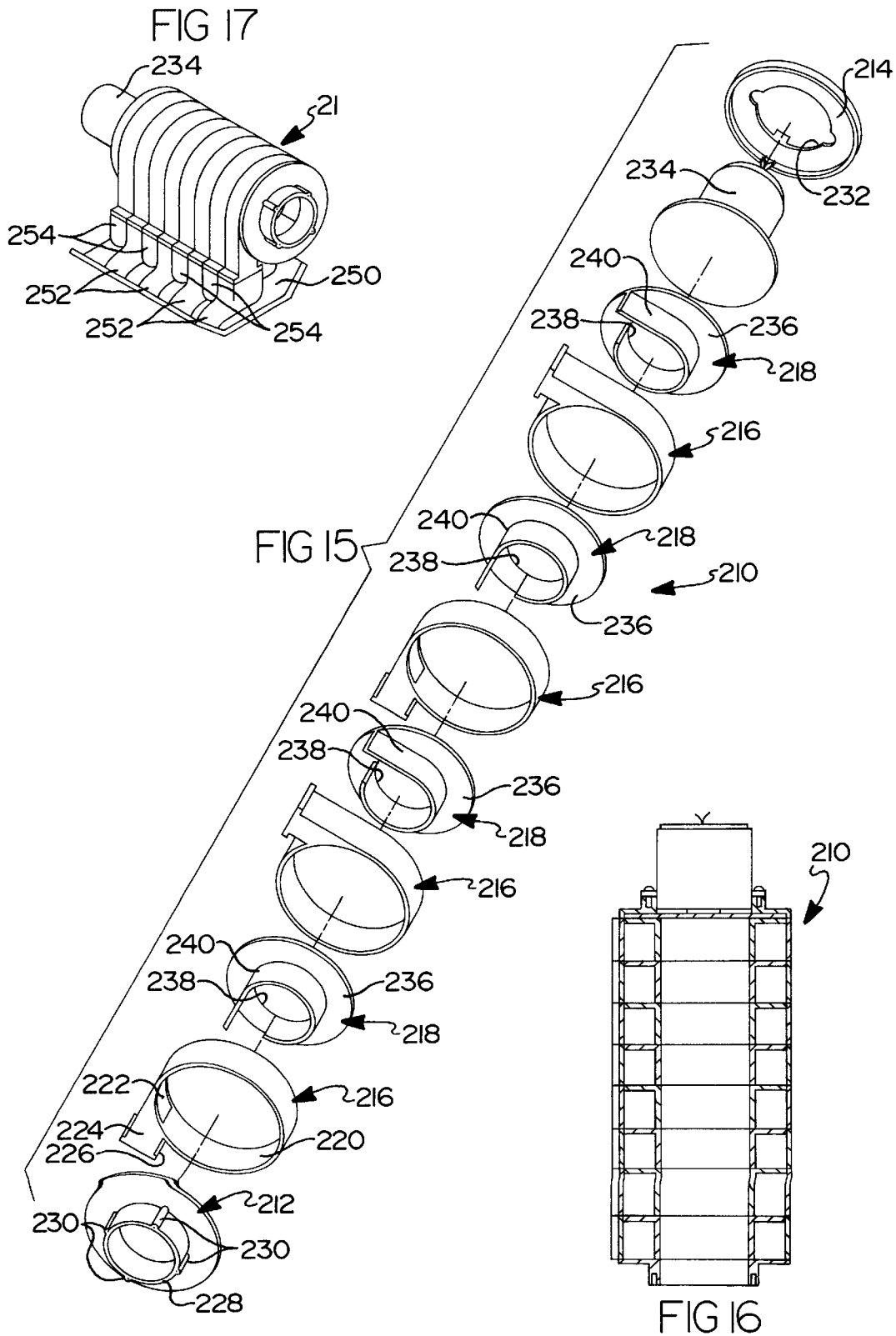

CONTINUOUSLY VARIABLE RUNNER LENGTH MANIFOLD

BACKGROUND OF THE INVENTION

Field of the Invention

The present invention relates to an air intake manifold for use with an internal combustion engine, and more particularly, to a continuously variable runner length manifold which incorporates the functions of a plenum, attachment flange, and continuously variable length runners into a plastic box formed from separate molded sections.

BACKGROUND AND SUMMARY OF THE INVENTION

The air intake manifold of a multi-cylinder engine is a branched pipe arrangement which connects the valve ports of each cylinder with the air inlet. In a carbureted engine, it would be connected between the valve ports and the carburetor which would be downstream of the air inlet. The manifold can have considerable effect on engine performance. The intermittent or pulsating nature of the airflow through the manifold into each cylinder may develop resonances (similar to the vibrations in organ pipes) in the airflow at certain speeds. These may increase the volumetric efficiency and thus, the power at certain engine speeds, but may reduce such efficiency at other speeds, depending on manifold dimensions and shape. Typically, each manifold passageway is ideally tuned to a length calculated to maximize or minimize a chosen criteria, such as sound or efficiency. Engines using intake manifolds of a fixed runner length exhibit power losses at certain speeds due to the manifold tuning. For a given length, there will be a standing pressure wave established inside the runner. If timed perfectly with the engine operation, this standing wave will act as a supercharger putting a densified air charge into the cylinder. The optimum tuning is dependent on engine speed. Therefore, a fixed length runner will only be optimally tuned for a certain engine speed. In order to overcome this, a continuously variable runner length is needed. With a continuously-variable runner length system, the intake manifold would be able to be set at the best runner length for the engine depending upon the engine speed, road speed, fuel economy, engine load, etc. This will improve engine performance at all operating conditions. The design is such that it will be easy and cheap to manufacture.

Conventional manifolds can usually be broken into three distinct parts, the plenum, the runners (fluid conduits or pipes), and an attachment portion having an engine-attaching surface. Manifolds are typically made from steel, aluminum or plastic. Making manifolds from plastic material reduces the weight of the manifold. The assembly of the lighter plastic manifold is also less complex and more ergonomical than steel or aluminum manifolds. The use of plastics provides the ability to add intricate features to the manifold. Furthermore, plastic manifolds can be produced with reduced costs. For conventional plastic manifolds, there are two processes currently accepted as production methods. The fusible core process and the multi-shell, welded process. The fusible core process is capital intensive, and difficult to keep in operation. The multi-shell welded manifold process produces relatively large parts which can waste significant underhood room. With ever-decreasing available underhood packaging room, the problem of fitting a manifold to an engine becomes a greater challenge. Accordingly, it is desirable in the art of engine manifolds to provide a continuously variable runner length manifold which is lightweight, has smaller packaging requirements, and which is easy to manufacture.

The present invention provides a continuously variable runner length manifold for an internal combustion engine including a housing defined by a plurality of plastic housing sections stacked together and having an inlet port and a plurality of outlet ports. A plurality of runner members are rotatably mounted within the housing. The runner members include a wall portion which combine with the housing to define a plurality of runners in communication with a plenum and a corresponding outlet port. The runners have a length which is continuously variable upon rotation of the runner members relative to the housing.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a perspective view of a rear end manifold section having an adjustable runner member for defining the runner length according to the principles of the present invention;

FIG. 4 is a perspective view of the rear end manifold section shown in FIG. 3;

FIG. 5 is a perspective view of a front end manifold section of the continuously variable runner length manifold assembly according to the principles of the present invention;

FIG. 6 is a perspective view of an interior manifold section of the continuously variable runner length manifold assembly according to the principles of the present invention;

FIG. 7 is a perspective view of the rear of an interior manifold section of the continuously variable runner length manifold assembly according to the principles of the present invention;

FIG. 8 is a perspective view of an interior manifold piece having an opposite orientation of the interior manifold piece shown in FIG. 6;

FIG. 13 is a perspective view of a continuously variable runner length manifold assembly according to a third embodiment of the present invention;

FIG. 14 is a cross-sectional view taken through a runner of a continuously variable runner length manifold assembly illustrating the different runner lengths which can be achieved by rotation of the internal runner member according to the third embodiment of the present invention;

FIG. 15 is an exploded perspective view of the components of the continuously variable runner length manifold assembly as shown in FIG. 12;

FIG. 16 is a cross-sectional view of a continuously variable runner length manifold assembly for use with an eight cylinder engine according to the third embodiment of the present invention; and FIG. 17 is a perspective view of a continuously variable runner length manifold according to a fourth embodiment of the present invention.

DETAILED DESCRIPTION OF THE PREFERRED EMBODIMENTS

Figure 1:
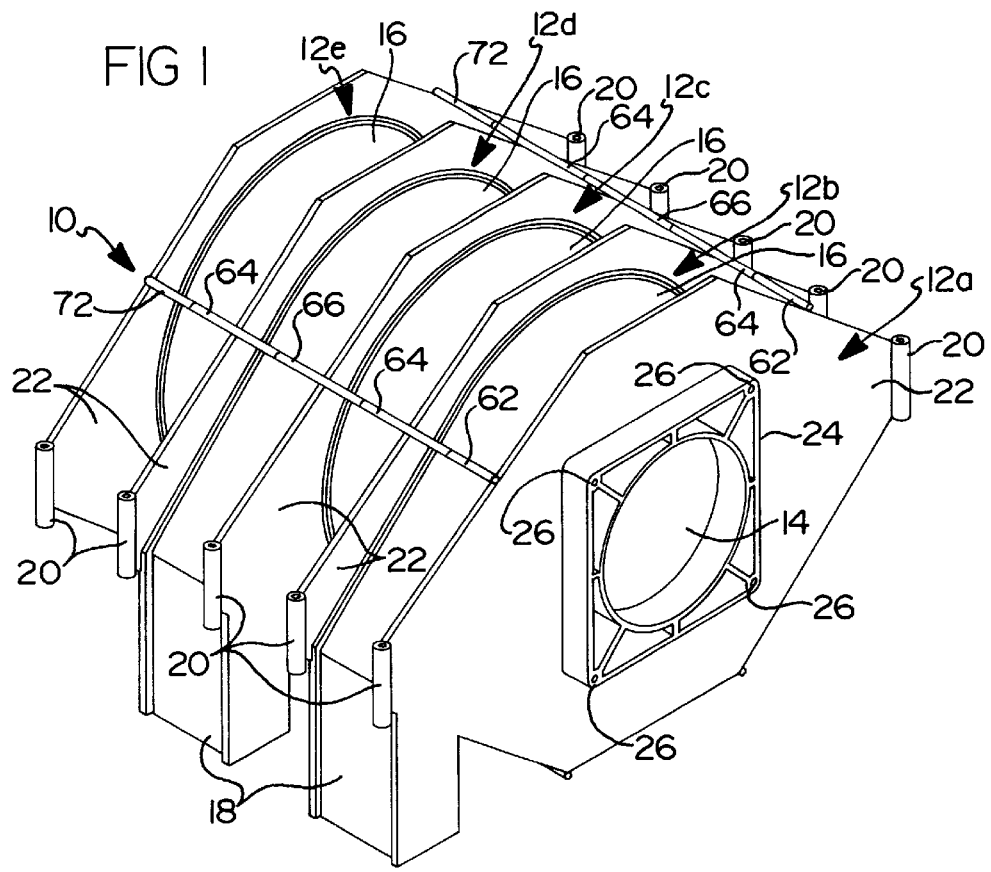
FIG. 1 is a perspective view of a continuously variable runner length manifold according to the principles of the present invention.

With reference to FIGS. 1–8, a first embodiment of the present invention will now be described. As shown in FIG. 1, a continuously variable runner length manifold 10 includes a plurality of manifold sections 12a–12e. The manifold sections 12a–12e are attached to one another in a stacked relationship in order to define an air intake manifold for use with an internal combustion engine. Continuously variable runner length manifold 10 includes a plenum portion 14 which communicates with a plurality of runners 16 each having an outlet port 18 for communicating with an engine intake port.

A plurality of mounting bosses 20 are provided for mounting the stacked manifold sections 12 to an internal combustion engine. Manifold sections 12a–12e each include a generally flat plate 22 forming a base portion thereof. End manifold section 12a is provided with a mounting flange 24 on a first surface of plate 22. Mounting flange 24 is connected to the carburetor or throttle body of the air intake system (not shown). Mounting flange 24 can be integrally molded with end manifold section 12a or it can be mounted thereto. Mounting flange 24 includes a plurality of bosses 26 for receiving mounting screws for attachment to a carburetor or throttle body. Bosses 26 can be designed to receive threaded fasteners or brass inserts (not shown). The inserts can be heat staked, ultrasonically staked, or press fit into bosses 26.

Manifold sections 12a–12d each include a wall structure 28 which extends from a second side of plate 22 as best shown in FIG. 7. Wall structures 28 each include an outer wall 34 which defines the outer wall of the spiral-shaped runners 16 when the manifold is assembled. An inwardly extending wall section 36 is also provided for directing the airflow of the runners 16 to the outlet port 18. The wall structure 28 is engaged with corresponding grooves 38 interdisposed on a first surface of the flat plate 22 of manifold sections 12b–12e. Grooves 38 of the manifold sections 12b–12e mirror the shape of the wall structure 28 of the adjacent manifold sections.

A circular groove portion 30 is formed on the second surface of the plate 22 of manifold sections 12a–12d. In addition, a corresponding circular groove portion 31 is formed on the first surface of plates 22 of manifold sections 12b–12e. A cylindrical runner member 40 is rotatably disposed between circular grooves 30 and 31 of adjacent manifold sections 12a–12e. The cylindrical runner members 40 include a radial opening 42 which communicate between the central plenum 14 and the corresponding runners 16 defined by the cylindrical runner members 40 and the assembled manifold sections 12a–12e.

Figure 2:
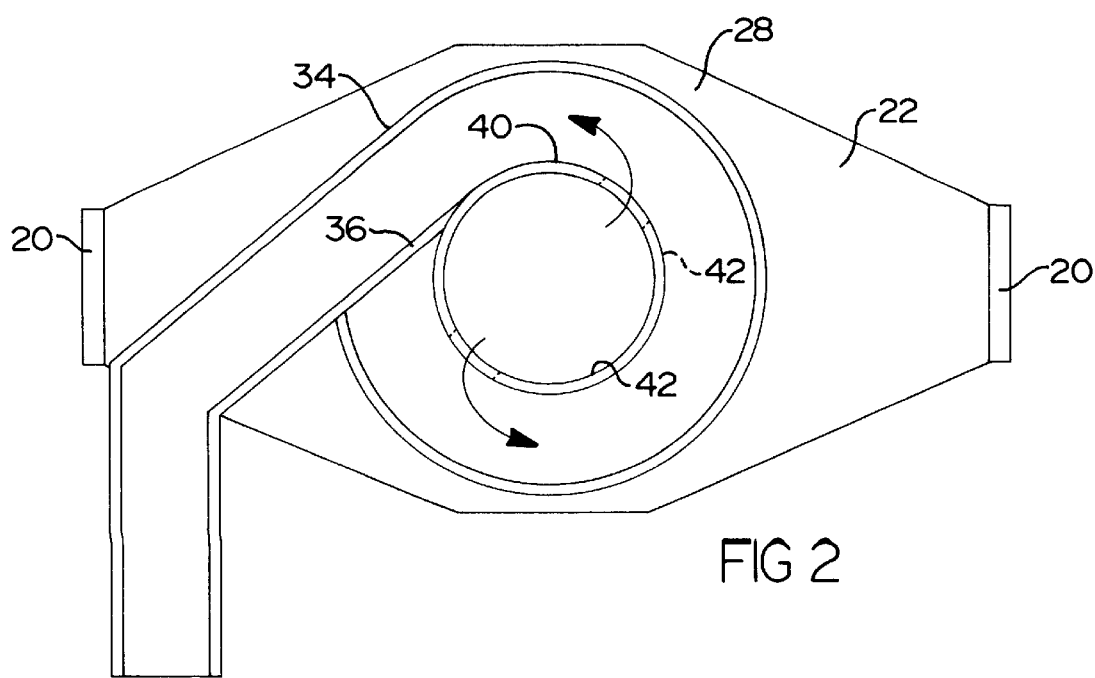
FIG. 2 is a cross-sectional view of a runner having a continuously variable runner length according to the principles of the present invention.
Figure 10:
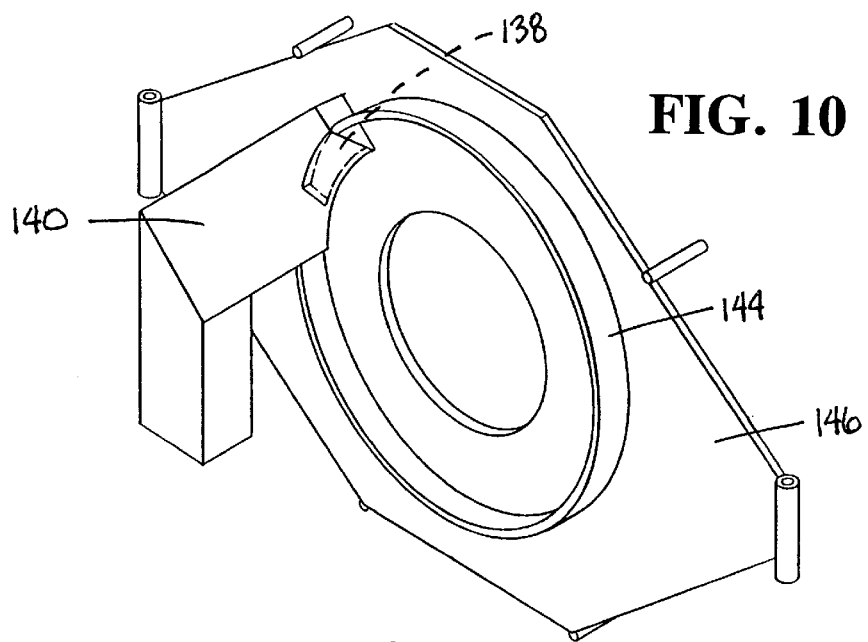
FIG. 10 is a perspective view of a back side of an interior manifold section according to the second embodiment of the present invention.
Figure 9:
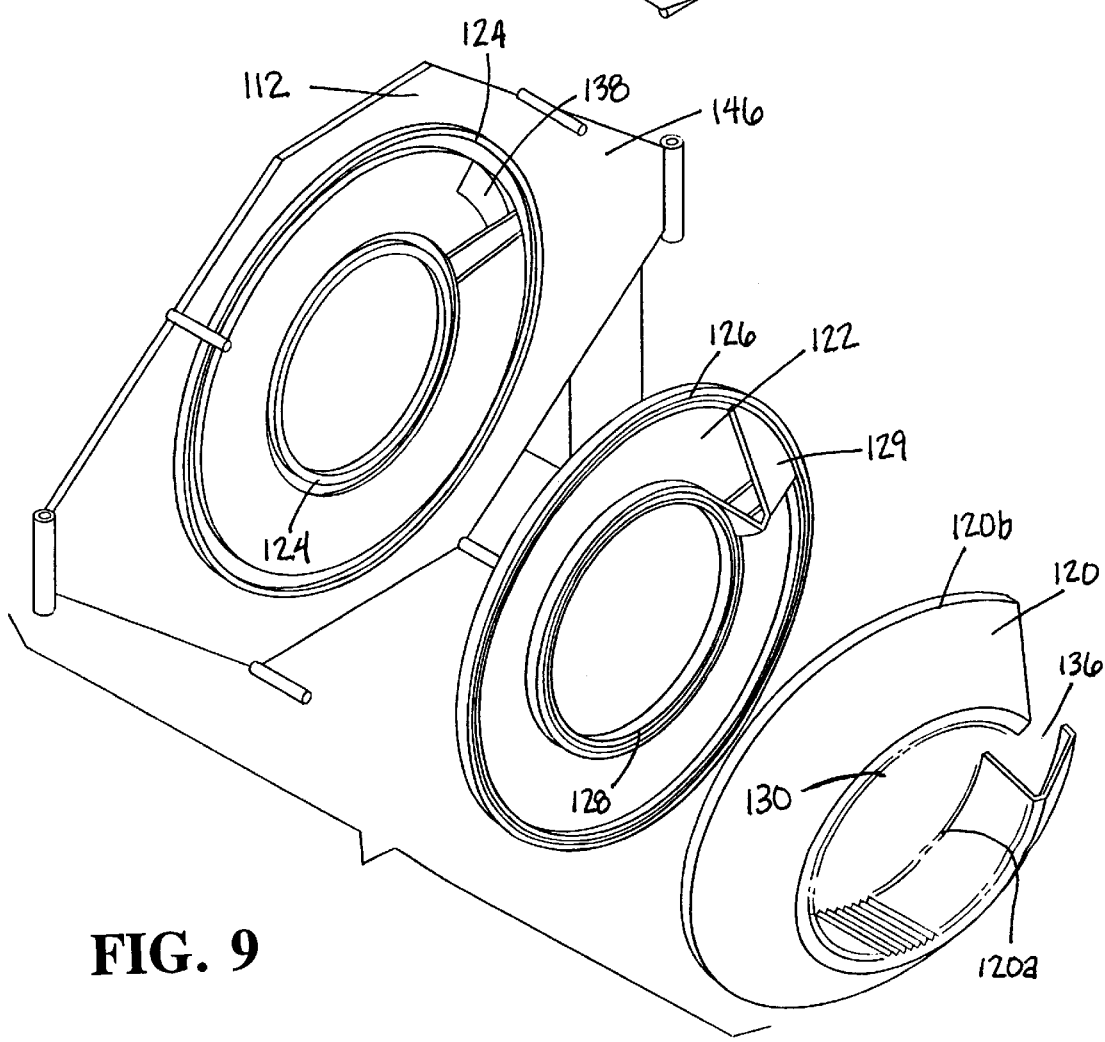
FIG. 9 is an exploded perspective view of a continuously variable runner length manifold assembly in a disassembled condition according to a second embodiment of the present invention.
Figure 11:
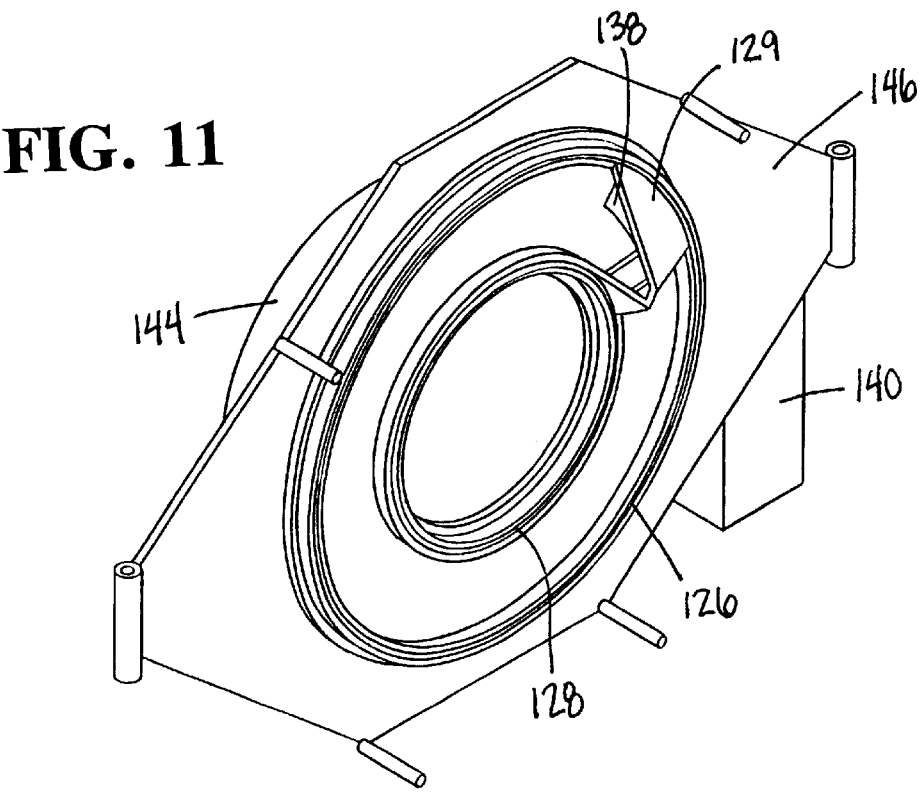
FIG. 11 is a perspective view of the interior manifold section with an insert according to the second embodiment of the present invention.

The cylindrical runner members 40 are provided with internal gear teeth 44 which are integrated into their structure and are engaged by shafts 46 and 48 which are provided with mating geared portions 50 which mate with every other runner member 40. The first shaft 46 rotates the runner members 40 providing air to one side of the engine block while the second shaft 48 rotates the cylindrical runner members 40 providing air to the opposite side of the engine block. As each cylindrical runner member 40 turns, the opening 42 moves to shorten or lengthen the air path from the plenum of the manifold to the engine block, as best illustrated in FIG. 2.

Preferably, the cylindrical runner member 40 is made from acetal which has a low friction coefficient in moving rotatably within opposed circular grooves 30, 31. As an alternative, the cylindrical runner members 40 can be made of nylon and the grooves 30, 31 on the manifold sections 12a–12e would have acetal rings inserted into them. The acetal provides a smooth low friction surface for the nylon runner members 40 to glide across. Basically, acetal inserts would be placed in the grooves 30, 31, then the nylon cylindrical runner members 40 would be placed in the acetal inserts.

FIG. 1 illustrates each of the manifold sections 12a–12e necessary for constructing the housing of the continuously variable runner length manifold 10 for use with a V-type engine. In particular, the design of end manifold section 12a is unique in that it includes a mounting flange 24 for mounting to the carburetor or throttle and includes boss members 62 which extend rearward from plate 22 half the distance of the width of wall structure 28, as best shown in FIG. 5. Mounting bosses 62 of end manifold section 12a align with bosses 64 of manifold section 12b. Bosses 64 of manifold section 12b extend transversely from plate 22 a distance approximately equal to one-half the height of wall structure 28 of end manifold 12a and wall structure 28 of manifold section 12b. Manifold section 12b is designed to have the outlet 18 disposed on the opposite side of the manifold 10 relative to outlet 18 of manifold section 12a and manifold section 12c. Manifold section 12c has the same wall structure 28 as manifold section 12a but is provided with grooves 38 on the front face of plate 22 for mating with corresponding wall structure 28 of manifold section 12b, as best shown in FIG. 8. Manifold section 12c is provided with mounting bosses 66 which align with mounting bosses 64 of manifold section 12b. A manifold section 12d is identical to manifold section 12b including grooves 38 which mate with wall structure 28 of manifold section 12c and bosses 64 which align with bosses 66 of manifold section 12c. An end cap manifold section 12e is provided to seal the last of the runner manifold sections 12d. As shown in FIG. 4, end cap manifold section 12e includes a generally flat plate 22 which includes grooves 38 which mate with wall structure 28 of manifold section 12d. A plurality of bosses 72 extend forward from plate 22 of manifold section 12e and align with bosses 64 of manifold section 12d.

In order to secure the manifold sections 12a–12e together, pins are inserted through bosses 62, 64, 66, 64, and 72. The pins (not shown) can be made from plastic such as nylon or from metal. Furthermore, an adhesive sealant may be used for sealing the wall structure of each manifold section in corresponding grooves 38 of each adjacent manifold section. The adhesive sealant can be any known suitable adhesive sealant, such as room temperature vulcanizing (RTV) silicone sealant.

The end cap manifold section 12e is provided with openings 74, as seen in FIG. 4, for receiving and supporting drive shafts 46, 48. Drive shafts 46, 48 are each engaged by an actuator device such as, for example, an electric motor or vacuum actuator (not shown) for controllably rotating drive shafts 46, 48.

Outlet ports 18 are designed to be received into a pocket on the cylinder and are provided with radial seals or O-rings. The assembly to the engine entails dropping the outlet ends 18 into the pockets in the cylinder heads. Each runner end has a sealing system including an O-ring for providing an annular seal around the outlet 18. The manifold is fastened to the engine using vertical bolts through the outermost bosses 20. Alternatively, outlets 18 could be provided with a plurality of mounting bosses disposed along the edges thereof for mounting the manifold outlet port 18 to the upper surface of the cylinder head with individual fasteners for each runner.

Figure 12:
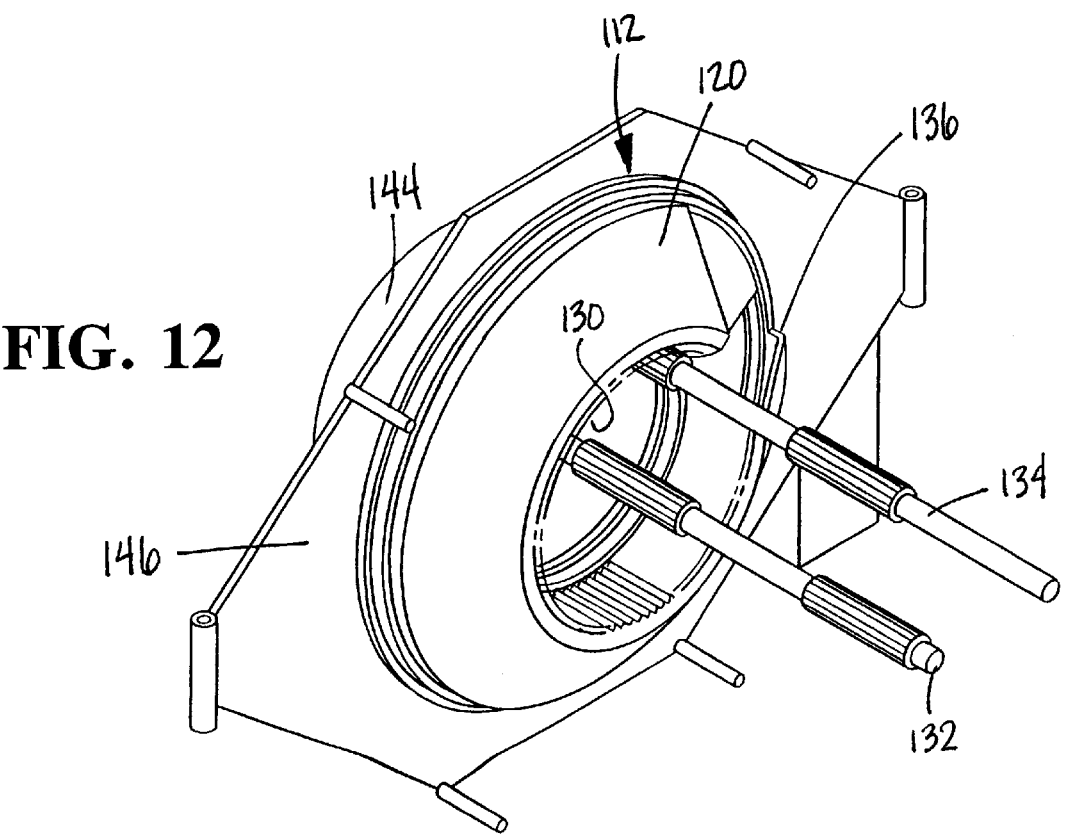
FIG. 12 is a perspective view of a portion of the continuously variable runner length manifold assembly shown in an assembled condition according to the second embodiment of the present invention.

With reference to FIGS. 9–12, a second embodiment of the present invention will now be described. The manifold sections 112 of the continuously variable runner length manifold assembly according to the second embodiment are similar to the manifold section 12a–12e. The manifold sections 112 are attached to one another in a stacked relationship in order to define the housing of the continuously variable runner length manifold for use with an internal combustion engine. The continuously variable runner length manifold, according to the second embodiment, uses a runner member in the form of a channel 120 made of nylon that rotates in an acetal insert 122 placed within the grooves 124 of the nylon manifold section 112. The acetal insert 122 contains grooves 126, 128 for receiving inner and outer ring portions 120a, 120b of the channel 120. The channel 120 rotatably glides in grooves 126, 128 and combine with an air deflection hood portion 129 of the acetal insert 122 for directing air through outlet ports 140. The manifold sections 112 are bolted together with the channels 120 and inserts 122 placed between them. The channels 120 have internal gear teeth 130 integrated into their structure and are then rotated using geared shafts 132, 134 as shown in FIG. 12. There are two shafts, 132, 134, one shaft 132 to rotate the channels providing air to the left side of the engine block and the other shaft 134 for providing air to the right side of the engine block. As each channel 120 turns, the opening 136 provided in the channel 120 moves to shorten or lengthen the air path from the plenum of the manifold to the engine block. The air then passes through a hole 138 in the manifold section 112 and through the outlet port 140 on the backside. The manifold sections 112 include a wall structure 144 extending perpendicular to second surface of the plate-type base 146 of each manifold section 112. The manifold sections 112 are stacked together and assembled in a similar manner to the embodiment shown in FIGS. 1–8, as discussed above. Furthermore, the manifold sections 112 are assembled together and to the engine in a similar manner as described above with respect to the first embodiment shown in FIGS. 1–8.

With reference to FIGS. 13–16, a third embodiment of the continuously variable runner length manifold 210 will now be described. The continuously variable runner length manifold 210 generally includes four different molded plastic components. In particular, with respect to FIG. 15, the continuously variable runner length manifold 210 includes a front end cap 212 and a rear end cap 214. A plurality of manifold housing sections 216, as well as a plurality of runner members 218 are stacked together between the end plates 212, 214 in order to form the continuously variable runner length manifold 210. The manifold housing sections 216 are all identically formed and include a cylindrical base portion 220 each having an opening 222 formed therethrough which open into an outlet port 224. Outlet port 224 is provided with a mounting flange portion 226 for mounting the continuously variable runner length manifold 210 to an engine. The front end plate 212 includes a mounting flange 228 including a plurality of bosses 230 for receiving mounting screws for attachment to a carburetor or a throttle body.

Rear end plate 214 includes an opening 232 for receiving a drive motor unit 234 for driving the rotatable runner members 218 for varying the runner length of the continuously variable runner length manifold 210. The rotatable runner members 218 include a generally flat plate portion 236 having a central hole 238 disposed therethrough. A spiral-shaped wall portion 240 extends transversely to the plate portion 236. Each of the elements shown in FIG. 15 is stacked together to form a continuously variable runner length manifold assembly as shown in FIG. 13. Every other outlet port 224 is angularly offset in order to provide air to the left and right sides of the vehicle engine. Likewise, the rotatable runner members 218 are angularly offset from one another in order to provide runner lengths which are equivalent to one another. The continuously variable runner length manifold assembly 210 is provided with a single motor 234 which rotates the rotatable runner members 218 which are fixed to one another for continuously varying the runner lengths. As shown in FIG. 14, the runner members 218 can be rotated in the direction of the arrow A. As shown in solid lines, spiral wall portion 240 defines a long runner, while the runner member 218 can be rotated, for example, to the position where the wall 240 is shown in phantom so that a shorter runner is defined.

FIGS. 13 and 15 illustrate the components for a four-cylinder V-type engine. By simply aligning each of the manifold housing sections 216, the manifold assembly 210 of the present invention can be modified to accommodate an in-line-type engine. As shown in FIG. 16, the manifold assembly 210 can also be readily utilized with an eight-cylinder engine, and as can be understood by one of ordinary skill in the art, can also be utilized with a six-cylinder or other multiple cylinder arrangements without requiring modification of the manifold sections 216. The manifold sections 216 and the runner members 218 are each provided with bosses 246 and 248, respectively, for receiving pins for securing the manifold sections 216 and the runner members 218 to each other, respectively. The pins used for securing runner members 218 together also secure the runner members 218 to be motor 234. The bosses 246, 248 are disposed at 90-degree increments for allowing the manifold sections 216 and runner member 218 to be aligned or angularly offset with one another depending upon the application.

With reference to FIG. 17, the manifold assembly 210 can also be utilized with a manifold base 250 which distributes the air to opposing sides of the V-type engine via passages 252, 254. The manifold base portion 250 can be easily molded using known plastic molding techniques. The runner lengths can be varied by operation of motor 234 for rotating the inner rotatable runner members 218 as described above.

The manifold sections of the continuously variable runner length manifold according to the principles of the present invention are preferably made from an engineering plastic material having suitable performance properties such as desirable heat stability and dimensional stability. By desirable heat stability, it is meant that the plastic material should be capable of withstanding the high temperatures that occur on the surface of the engine. By dimensional stability, it is meant that the material should not expand, contract, or warp under extreme high or low temperatures. Preferred materials are nylon (polyamide), ABS polymer (acrylonitrile-betadiene-styrene), and polycarbonate. Such materials may also be reinforced with glass and/or mineral fibers or particles. Especially preferred materials are ULTRAMID® A3HG7 Blk Q17 20560 nylon, ULTRAMID® A3WG7 Blk 23210 nylon, and ULTRAMID® B3WG7 Blk 564 BGVW nylon, commercially from BASF Corporation of Wyandotte, Mich. The use of such materials provides a weight reduction in comparison with steel and aluminum manifolds which are currently in use. Furthermore, such materials require lower temperatures during processing in comparison to steel and aluminum. Thus, the manufacture of plastic manifolds is simpler and less expensive than steel or aluminum manifolds.

The stacked arrangement of the continuously variable runner length manifold, according to the present invention, is much cheaper than the lost core manifold process. In addition, the method of the present invention is easily adapted for use with V-four, V-six, V-eight, and in-line engines. Furthermore, a simple design permits rapid changes as needed without expensive tooling overhauls and allows for the use of continuously variable runner lengths.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A continuously variable runner length manifold assembly for an internal combustion engine, comprising:
    a housing having an inlet port and a plurality of outlet ports, said housing being defined by a plurality of stacked manifold sections; and
    a plurality of runner members rotatably mounted within said housing, said runner members each having a wall portion which combines with said manifold sections to define a runner in communication with a plenum and a corresponding outlet port, said runners each having a length which is continuously variable upon rotation of said runner members relative to said housing.

2. The manifold assembly according to claim 1, further comprising a drive mechanism drivingly engaged with said runner members for rotatably driving the runner members for varying the length of the runner.

3. The manifold assembly according to claim 2, wherein said drive mechanism includes an electronically controlled motor.

4. The manifold assembly according to claim 1, wherein said plenum is disposed along a center of said housing.

5. The manifold assembly according to claim 1, wherein said housing is made of nylon.

6. The manifold assembly according to claim 1, wherein said runner members are made of acetal.

7. The manifold assembly according to claim 1, wherein said runner members include a semicircular wall section disposed between said manifold sections.

8. The manifold assembly according to claim 1, wherein said runner members are cylindrical in shape.

9. The manifold assembly according to claim 8, wherein said runner members include internal gear teeth, said internal gear teeth being engaged by a mating gear portion of a drive shaft.

10. The manifold assembly according to claim 1, further comprising a plurality of insert members including first and second groove portions for slidably receiving inner and outer ring portions of respective ones of said runner members, and an air deflection hood portion for directing air through said outlet ports.

11. A manifold assembly, comprising:
    a housing including a plurality of manifold sections stacked together, said manifold sections each including an outlet port and an outer wall portion; and
    a plurality of runner members each having a wall portion cooperating with said manifold sections for defining a plurality of runners.

12. The manifold assembly according to claim 11, wherein said plurality of runner members are rotatably mounted within said housing for continuously varying a length of said plurality of runners.

* * * * *